Oct. 9, 1934.                C. M. MOORE                1,975,858
                        SHANK PIECE AND STIFFENER
                           Filed Aug. 22, 1932
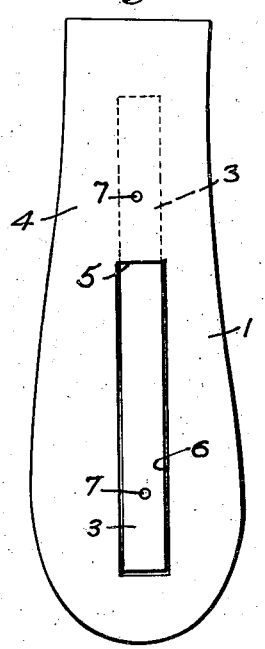
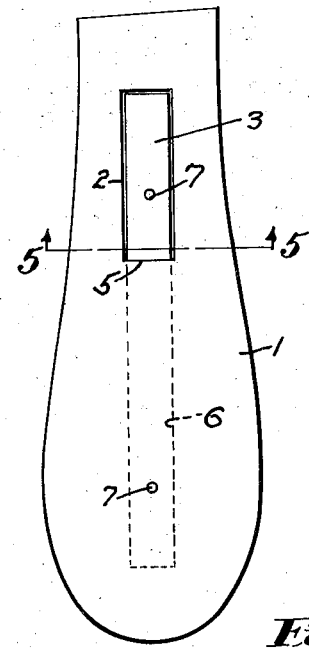
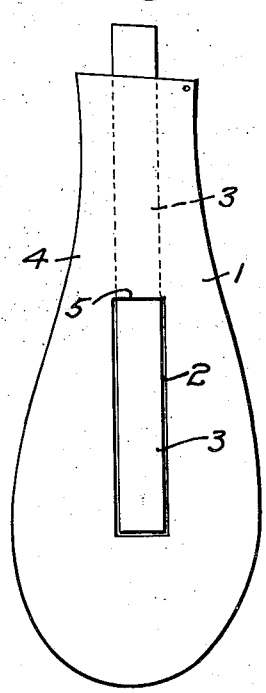
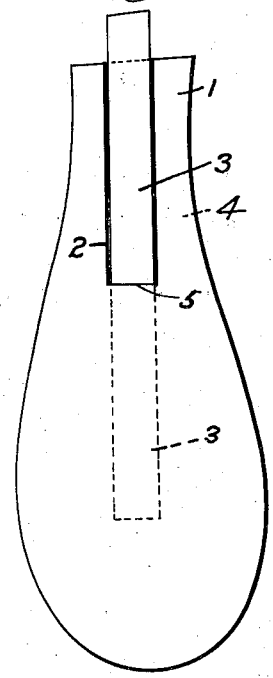
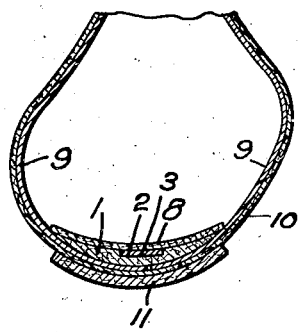
Inventor:
Chester M. Moore,
by [signature]
Att'ys.

Patented Oct. 9, 1934

1,975,858

UNITED STATES PATENT OFFICE 1,975,858

SHANK PIECE AND STIFFENER

Chester M. Moore, Wakefield, Mass.

Application August 22, 1932, Serial No. 629,794

1 Claim. (Cl. 36—76)

This invention relates to shoe making in general and especially to the shank portion of a shoe, and aims to provide a novel combined shank piece and stiffener therefor. It is particularly adapted for use in cemented shoes, although entirely desirable for use in a sewed shoe or tacked or stapled lasted shoe.

In the drawing of one embodiment of my invention described and illustrated herein:

Fig. 1 is a bottom view of my novel shank piece and stiffener;

Fig. 2, a top view or plan;

Fig. 3, a bottom view of a modified form of construction wherein the shank stiffener extends beyond the end of the shank piece;

Fig. 4, a plan thereof; and

Fig. 5, a vertical cross sectional view through the shank portion of a cemented shoe and shank at approximately the line 5—5, Fig. 1, involving the use of my novel shank piece.

It is well known that in making cemented shoes where cement is mainly relied upon for securing a close and firm bond between the upper, insole, and outsole, much difficulty is experienced in achieving the desired result owing to the presence of the shank stiffener, usually of metal, at the shank portion of the shoe to which the cement will not satisfactorily adhere.

To overcome this and other difficulties I have conceived the novel construction above referred to.

Referring to Figs. 1 and 2, a suitable shank piece 1 of leatherboard or the like to which cement will adhere may have a suitable channel 2 depressed in the upper face thereof of a size to receive the shank stiffener 3. At a point sufficiently removed from the forward end of the shank piece to provide a suitable cementing area 4 on its lower face, the shank piece is provided with an opening 5 and the stiffener 3 is thrust therethrough so that a portion of it lies upon the top face in the channel 2 and a portion upon the bottom face of the shank piece in the channel 6. The two ends of the stiffener are suitably fastened to the shank piece by tacks 7 or otherwise.

This novel construction results in providing a satisfactory cementing area 4 the full width of the shank piece 1 at its forward end and of such length as may be desired, as obviously the stiffener may be thrust through the shank piece at almost any desired point.

By the use of this shank piece and stiffener, Fig. 5, after it has been secured to the insole 8, the lining and upper may then be lasted down upon and over this cementing area, Fig. 5, and a firm and satisfactory bond may be had between the upper, insole and outsole by means of the cement.

In this case, Fig. 5, the edges of the lining 9 and upper 10 may be brought down even until they meet, over and upon the shank piece, there finding a firm fastening or anchorage thereon before the outsole 11 is cemented thereto, which is a very important advantage, especially when the shank piece is narrow, and the anchorage at best, limited.

Another important advantage derived from the use of my novel shank piece and stiffener is the protection given the insole at the heel against cutting by the shank stiffener. When, as is common, the insole rests at the heel directly on the stiffener member, the insole is almost always cut through in use, by the edges of the stiffener, and to guard against it, it is the practice to use a heel reinforcing piece or slip between the insole and shank piece to protect the former and this extra member and expense thereof is saved by my construction, the edges of the stiffener being guarded against by the overlying heel portion of the shank piece.

This results in the making of a much better shoe, comparing favorably with shoes of other construction.

In shoes of a different construction, however, the shank construction herein described provides one advantage, namely, it prevents squeaking.

By splitting up or shortening the length of contact between the stiffener and both insole and outsole, little tendency exists to squeak which condition is much to be desired.

Figs. 3 and 4 each show respectively modified forms of construction which may be used if desired for any reason and which will give the benefit of the most important of the novel features of my invention.

Fig. 5 illustrates the construction at the shank of a shoe involving the use of my novel shank piece.

My invention is not restricted to the particular embodiment thereof herein disclosed and described.

I claim:

A shank piece for boots and shoes, the shank piece having a stiffener channel in each face thereof, a shank stiffener therein, and a transverse slot in the channel with the stiffener extended through the slot and shank piece toward the opposite ends of the shank piece.

CHESTER M. MOORE.